(12) United States Patent
Peguin et al.

(10) Patent No.: US 12,195,675 B2
(45) Date of Patent: Jan. 14, 2025

(54) METHODS AND SYSTEMS FOR CO-FEEDING WASTE PLASTICS INTO A REFINERY

(71) Applicant: Braskem S.A., Camaçari (BR)

(72) Inventors: Robson Pablo Sobradiel Peguin, São Paulo (BR); Steven Michael Krupinski, Philadelphia, PA (US); Kevin Richard Soucy, Philadelphia, PA (US); Jiahan Xie, Philadelphia, PA (US); Cid Miró Neto, São Paulo (BR); Roberto Osorio Jiménez, São Paulo (BR)

(73) Assignee: Braskem S.A., Camaçari (BR)

( * ) Notice: Subject to any disclaimer, the term of this patent is extended or adjusted under 35 U.S.C. 154(b) by 0 days.

(21) Appl. No.: 18/581,265

(22) Filed: Feb. 19, 2024

(65) Prior Publication Data

US 2024/0294833 A1 Sep. 5, 2024

Related U.S. Application Data

(62) Division of application No. 18/101,528, filed on Jan. 25, 2023, now Pat. No. 11,939,532.

(Continued)

(51) Int. Cl.
*C10G 1/10* (2006.01)
*B01F 21/00* (2022.01)
(Continued)

(52) U.S. Cl.
CPC ............. *C10G 1/10* (2013.01); *B01F 21/02* (2022.01); *B01F 21/30* (2022.01); *B01F 21/401* (2022.01); *B01F 33/821* (2022.01);

*B01F 35/189* (2022.01); *B01F 2101/2805* (2022.01); *C10G 2300/1003* (2013.01);
(Continued)

(58) Field of Classification Search
CPC .. C10G 11/18; C10G 1/10; C10G 2300/1003; C10G 2300/1044; C10G 2300/302; C10G 2300/4081; C10G 9/005; C10G 9/007; C10G 47/00; C10G 1/002; B01F 21/02; B01F 21/30; B01F 21/401; B01F 33/821;
(Continued)

(56) References Cited

FOREIGN PATENT DOCUMENTS

EP 4151704 A1 * 3/2023 ............ C10G 1/002

* cited by examiner

*Primary Examiner* — Thuan D Dang
(74) *Attorney, Agent, or Firm* — Osha Bergman Watanabe & Burton LLP

(57) ABSTRACT

The present application provides a method and a system for recycling a polymer. The method includes introducing polymer into a primary melting extruder, producing a polymer melt that is combined with a fluid oil to at least partially dissolve the polymer melt. A secondary mixing extruder mixes these to form a polymer solution that is introduced into a refinery oil stream, producing a polymer-comprising oil stream, which is fed into a refinery process unit. The system includes a primary melting extruder for forming a polymer melt from polymer. A secondary mixing extruder receives the polymer melt. One or more hydrocarbon inflow conduits for providing a fluid oil to the primary melting extruder and/or the secondary mixing extruder are configured to form a polymer solution from the fluid oil and the polymer melt. There is a feed system outlet for feeding the polymer solution to a refinery oil stream.

8 Claims, 9 Drawing Sheets

Related U.S. Application Data

(60) Provisional application No. 63/302,816, filed on Jan. 25, 2022.

(51) Int. Cl.
*B01F 33/82* (2022.01)
*B01F 35/00* (2022.01)
*B01F 101/00* (2022.01)

(52) U.S. Cl.
CPC ............... *C10G 2300/1044* (2013.01); *C10G 2300/302* (2013.01); *C10G 2300/4081* (2013.01)

(58) Field of Classification Search
CPC .......... B01F 35/189; B01F 2101/2805; Y02W 30/62; C08J 11/12
See application file for complete search history.

METHODS AND SYSTEMS FOR CO-FEEDING WASTE PLASTICS INTO A REFINERY

CROSS-REFERENCE TO RELATED APPLICATIONS

This Application is a divisional application of U.S. patent application Ser. No. 18/101,528 filed on Jan. 25, 2023, which claims priority to U.S. Provisional Application No. 63/302,816 filed on Jan. 25, 2022, which are incorporated herein by reference.

BACKGROUND

The management of the polymer-based material lifecycle is important to maintain balance in a circular economy, particularly in products containing plastics. Plastics are commonly derived from petroleum sources and are generally non-biodegradable, therefore the need to build sustainable and effective post-industrial polymer recycling processes is felt across most industries on an international scale. The creation of a stainable solution to address polymer waste will provide a future-focused vision for industries and address environmental and economic concerns.

Plastics are inexpensive, easy to mold, and lightweight with many commercial applications. Generally, plastics are formed from virgin material, resin produced directly from petrochemical feedstock, such as natural gas or crude oil, which has never been used or processed before. Once the products have outlived their useful lives, they are generally sent to waste disposal such as landfill sites, adding to serious environmental problems, like land, water, and air pollution. In addition, the disposal costs for the post-industrial plastic waste poses an extra burden on processors and manufacturers. Also, there is the consideration that a high demand to produce more virgin resin material places a burden to on an already limited and depleting natural resource.

Plastics waste is traditionally disposed of by land fill, incineration, or recycling by reprocessing the waste into raw material for reuse. The use of post-industrial and post-consumer polymers ("plastic waste") through recycling has a variety of benefits over producing virgin resin. Unfortunately, while the economic, environmental, and even political demand for products made from recycled plastic exists, the added value created by conventional recycling methods is comparatively low. As a result, large amounts of used plastics can be only partially returned to the economic cycle. Moreover, conventional methods of recycling plastics tend to produce products with lower quality properties.

In addition to the technological limitations of conventional recycling methods, economic issues also impact the demand for plastic waste-based products. For example, the processes for extrusion of recycled plastic material may involve significant and costly pre-process steps like segregating and beading. The commercial viability of these processes may be impacted when the extrusion process and the product thereof is not of a level of quality as of a virgin resin material.

Even the political landscape impacts the recycling market. When international markets stop investing in domestic recycling streams, waste that would have otherwise gone to foreign recyclers is redirected to domestic landfills. The domestic infrastructure is not equipped to absorb and process the large amount of certain plastics entering in the waste stream, despite the pressure for domestic industries to do so.

Despite the challenges associated with recycling plastic waste such as polyethylene and polypropylene, there is a global push to bring innovative ways of recycling plastic waste to market.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for recycling a polymer. The method may include introducing a polymer into a primary melting extruder. A secondary mixing extruder mixes the polymer melt combined with a fluid oil to form a polymer solution of the polymer dissolved in the fluid oil that is introduced into a refinery oil stream, producing a polymer-comprising oil stream, which is fed into a refinery process unit.

In another aspect, embodiments disclosed herein relate to a system for recycling a polymer. The system may include a primary melting extruder for melting a polymer to form a polymer melt. A secondary mixing extruder receives the polymer melt from the primary melting extruder. One or more hydrocarbon inflow conduits for providing a fluid oil to the primary melting extruder and/or the secondary mixing extruder are configured to form a polymer solution from the fluid oil and the polymer melt. To form the polymer solution, the polymer is at least partially dissolved in the fluid oil. There is a feed system outlet for feeding the polymer solution to a refinery oil stream.

Other aspects and advantages of the claimed subject matter will be apparent from the following description and the appended claims.

DETAILED DESCRIPTION

In one aspect, embodiments disclosed herein relate to methods and systems for recycling waste plastics, also referred to as polymer, into a refinery oil stream. In particular, embodiments disclosed herein may co-feed such polymer with an oil stream into a refinery process unit through a process that provides for melting the polymer and mixing it with oil. Advantageously, the presently described methods and systems may also allow for contaminant removal prior to the mixed polymer and oil being fed into a refinery process unit. In addition, embodiments of the presently described methods and systems may allow for recycling polymer without significantly changing the downstream processes.

Figure 1:
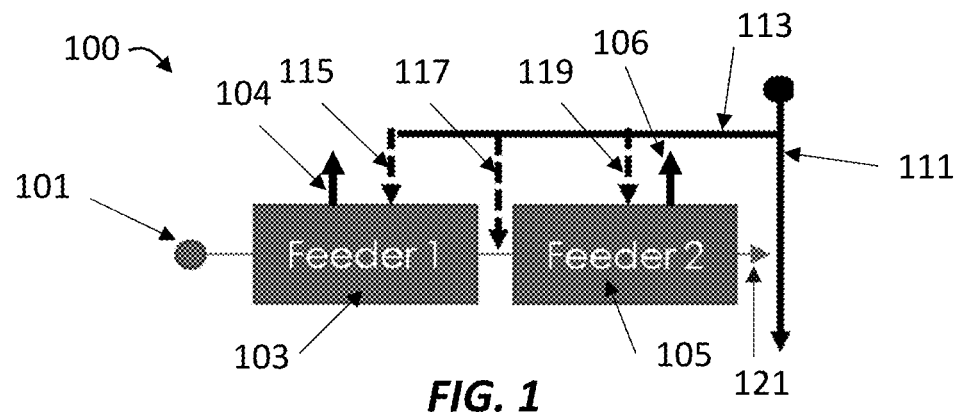
FIG. 1 is a depiction of a feed system 100 for recycling polymer in a refinery oil stream, according to one or more embodiments.

FIG. 1 is a depiction of a feed system 100 for recycling polymer in a refinery oil stream, according to one or more embodiments. Feed system 100 includes a polymer source 101 connected to two polymer extruders: primary melting extruder 103, and secondary mixing extruder 105. Secondary mixing extruder 105 has an outlet 121 connecting it with a refinery oil stream 111. Several hydrocarbon inflow conduits, or feeder oil inlets, are present as well that are connected to a refinery oil stream 111 via a refinery oil offshoot 113. The feeder oil inlets include primary melting extruder inlet 115, post primary melting extruder inlet 117, and secondary mixing extruder inlet 119. Several feeder vents, specifically a primary melting extruder vent 104 and a secondary mixing extruder vent 106 are present as well.

In FIG. 1, polymer from the polymer source 101 is introduced into primary melting extruder 103, where it is melted to produce a polymer melt. In one or more embodiments, primary melting extruder 103 may comprise any equipment capable of melting and conveying a polymer apparent to one of ordinary skill in the art. These may include, but are not limited to, one or more extruders such as twin-screw extruders or single-screw extruders. A primary melting extruder vent 104 is present in the current embodiments for the removal of volatile components from the primary melting extruder 103. A hydrocarbon inflow conduit, or feeder oil inlet, primary melting extruder inlet 115, is present in the embodiments of FIG. 1, where it conveys a fluid oil from the refinery oil offshoot 113 to primary melting extruder 103. Fluid oil is introduced via primary melting extruder inlet 115 downstream of the introduction of polymer such that polymer has already begun to melt upon the introduction of fluid oil. Upon the addition of fluid oil, the polymer melt is at least partially dissolved in the fluid oil, producing a polymer slurry that is further mixed. A polymer solution is formed upon full dissolution of the polymer melt in the fluid oil. The polymer slurry exits primary melting extruder 103, where additional fluid oil is added via post primary melting extruder inlet 117. The polymer slurry comprising the polymer melt and the fluid oil is then received by the secondary mixing extruder 105, where it is mixed, and additional fluid oil is added via secondary mixing extruder inlet 119. Secondary mixing extruder 105 may comprise any equipment capable of mixing the polymer slurry with the fluid oil. These may include, but are not limited to, one or more extruders such as twin-screw extruders, and single-screw extruders. A secondary mixing extruder vent 106 is present in the current embodiments for the removal of volatile components from the secondary mixing extruder 105. In one or more embodiments, it is envisioned that secondary mixing extruder 105 differs from primary melting extruder 103, for example with respect to extruder type, barrel length or diameter, screw dimensions, and/or number and temperatures of zones. Specifically, primary melting extruder 103 may be selected based on melting the polymer, whereas secondary mixing extruder 105 may be selected based on mixing polymer and fluid oil, as adding too much fluid oil prior to melting in primary melting extruder 103 may slow the melting and/or dissolution of the polymer in one or more embodiments. The polymer slurry and the fluid oil are further mixed, producing a polymer solution that is then introduced into the refinery oil stream 111 via outlet 121. The refinery oil stream may then take the refinery oil and polymer solution downstream to any number of refinery process units. These may include, but are not limited to, a delayed coking unit, a fluid catalytic cracking unit, a visbreaking unit, or a hydrocracking unit. The viscosity of the polymer solution and refinery oil stream may be tailored to the conditions of an individual refinery and its refinery process units by changing the fluid oil concentration in the polymer solution to allow for further processing of the polymer solution.

In the system of FIG. 1, the fluid oil may comprise one or more hydrocarbon fluids that may be present in a refinery. These include, but are not limited to, crude oil, vacuum residue, atmospheric residue, vacuum gas oil (VGO), heavy mineral oil, and residual oils. Polymer may be present in the polymer solution in a concentration ranging from about 0.01 wt. % to about 99.99 wt. %, for example from a lower limit of any of 0.01, 0.1, 0.5, 1, 5, 10, or 20 wt. % to an upper limit of any of 30, 40, 50, 60, 70, 80, 90, 95, 99 or 99.99 wt. %, where any lower limit can be used in combination with any upper limit. The polymer may be waste plastic polymers, recycled polymers, virgin polymers or a combination thereof, comprising, for example, one or more of polyethylene, polypropylene, polybutene, polybutadiene, ethylene-vinyl acetate polymer, polystyrene, ethylene vinyl alcohol (EVOH) polymer, co-polymers, or mixtures thereof. Polymer may be in the form of granules, powder, crushed chunks, slurry, films, melt, fines, shavings, chips, pellets, flakes, nurdles, scraps, or a mixture of these.

One or more polymer contaminants may also be present in the polymer. Contaminants that may be present may include polyethylene terephthalate, polyvinyl chloride, nylon, or a combination of these. Insoluble contaminants may also be present. Thus, in one or more embodiments, there may be a filter located in the path of the polymer, such as after primary melting extruder 103 or secondary mixing extruder 105 to remove insoluble components. Such insoluble components may comprise contaminants such as glass, ceramics, sand, pieces of metal, undissolved plastics, or other contaminants. Filters may be cleaned manually or automatically in a continuous or periodic fashion.

It is also envisioned that one or more volatile contaminants may also be present in polymer. It may be desired to remove these volatile contaminants to prevent them from entering downstream processes. Thus, one or more of the feeders may have one or more vents that are operable to remove volatile contaminants from the mixture, such as the primary melting extruder vent 104 and secondary mixing extruder vent 106. These vents may operate under vacuum, under atmospheric pressure, or under other pressures apparent to those of ordinary skill in the art. Vacuum is defined as a pressure that is less than atmospheric pressure. These vents may be present in the configurations shown in FIG. 1, or in other desirable configurations to remove volatile components, such as in positions that are different from those in FIG. 1 relative to feeder oil inlets. The volatile contaminants may include, but are not limited to, water, air, oxygen, HCl, volatile silicon compounds, and mixtures thereof. Some non-limiting examples of volatile silicon compounds include siloxanes and silanes. One or more HCl neutralizing agents, such as calcium oxide, calcium carbonate, or caustic solution, may be added to the polymer, to one or more of the fluid oil streams, or to both.

FIG. 1 shows one or more embodiments. Other embodiments may be possible. For example, other configurations of two feeder systems may be possible. In addition, it is also envisioned that not all the feeder oil inlets shown may be present, and some feeders or mixing devices may have more than one feeder oil inlet. Furthermore, one or more of the feeder oil inlets may convey fluid oil from a different refinery stream into the feed system, with the outlet 121 still emptying into the refinery stream 111. In addition, the feeder oil inlets may be in a configuration wherein the polymer melt is combined with a fluid oil to at least partially dissolve the polymer melt into the fluid oil in the primary melting extruder 103, and/or the secondary mixing extruder 105.

Figure 2:
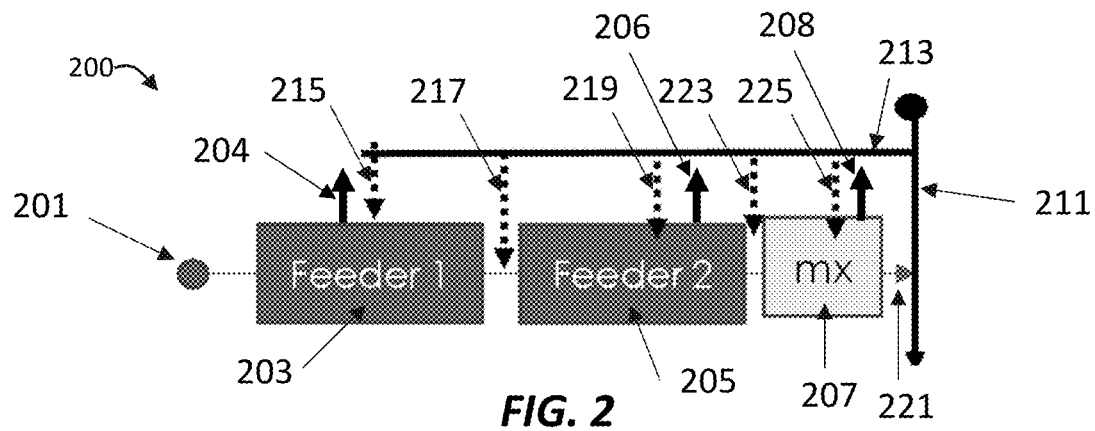
FIG. 2 is a depiction of a feed system 200 for recycling polymer in a refinery oil stream, according to one or more embodiments.

Referring now to FIG. 2, FIG. 2 is a depiction of a feed system 200 for recycling polymer in a refinery oil stream, according to one or more embodiments. Feed system 200 includes a polymer source 201 connected to two polymer feeders: primary melting extruder 203, and secondary mixing extruder 205, along with a mixing device 207. The mixing device 207 has an outlet 221 connecting it with a refinery oil stream 211. Several feeder oil inlets, also known as hydrocarbon inflow conduits, are present as well that are connected to a refinery oil stream 211 via a refinery oil offshoot 213. The feeder oil inlets include primary melting extruder inlet 215, post primary melting extruder inlet 217, secondary mixing extruder inlet 219, post secondary mixing extruder inlet 223, and mixing device inlet 225. Several feeder vents, specifically a primary melting extruder vent 204 and a secondary mixing extruder vent 206 are present as well, along with a mixing device vent 208.

In FIG. 2, polymer from the polymer source 201 is introduced into primary melting extruder 203, where it is melted to produce a polymer melt. In one or more embodiments, primary melting extruder 203 may comprise any pieces of equipment capable of melting and conveying a polymer apparent to one of ordinary skill in the art. These may include, but are not limited to, one or more extruders.

A primary melting extruder vent 204 is present in the current embodiments for the removal of volatile components from the primary melting extruder 203. A feeder oil inlet, primary melting extruder inlet 215, is present in the embodiments of FIG. 1, where it conveys a fluid oil from the refinery oil offshoot 213 to primary melting extruder 203. Upon the addition of fluid oil, the polymer melt is at least partially dissolved in the fluid oil, producing a polymer slurry that is further mixed. A polymer solution is formed upon full dissolution of the polymer melt in the fluid oil. The polymer slurry exits primary melting extruder 203, where additional fluid oil is added via post primary melting extruder inlet 217. The polymer slurry with fluid oil is then received by the secondary mixing extruder 205, where it is mixed, and additional fluid oil is added via secondary mixing extruder inlet 219. A secondary mixing extruder vent 206 is present in the current embodiments for the removal of volatile components from the secondary mixing extruder 205. Secondary mixing extruder 205 may comprise any pieces of equipment capable of mixing the polymer slurry with the fluid oil. These may include, but are not limited to a twin-screw extruder, and a single-screw extruder. As described above, primary melting extruder 203 and secondary mixing extruder 205 may be selected according based on phases of melting and mixing.

Additional fluid oil is added through post secondary mixing extruder inlet 223 after the polymer slurry exits secondary mixing extruder 205, before the material is conveyed into mixing device 207. In mixing device 207, additional fluid oil is added via a feeder oil inlet, mixing device inlet 225. Mixing device 207 may comprise any pieces of equipment capable of mixing the polymer slurry and fluid oil. These may include, but are not limited to, a continuous stirred tank mixer, a dynamic mixer, or static mixer. A mixing device vent 208 is present in the current embodiments to remove volatile components from mixing device 207. The slurry and fluid oil are mixed in mixing device 207, producing a polymer solution that is then conveyed into the refinery oil stream 211. The refinery oil stream may then take the refinery oil and polymer solution downstream to any number of refinery process units. These may include, but are not limited to, a delayed coking unit, a fluid catalytic cracking unit, a visbreaking unit, or a hydrocracking unit.

As in FIG. 1 described above, in the system of FIG. 2, the fluid oil may comprise one or more hydrocarbon fluids that may be present in a refinery. These may include, but are not limited to, crude oil, vacuum residue, atmospheric residue, vacuum gas oil (VGO), heavy mineral oil, and residual oils. Polymer may be present in the polymer solution in a concentration ranging from about 0.01% to about 99.99%, including those described above. Polymer may be in the form of granules, powder, crushed chunks, slurry, films, melt, fines, shavings, chips, pellets, flakes, nurdles, scraps, or a mixture of these. The polymer may comprise one or more of polyethylene, polypropylene, polybutene, polybutadiene, ethylene-vinyl acetate polymer, polystyrene, ethylene vinyl alcohol (EVOH) polymer, co-polymers, or mixtures thereof. One or more polymer contaminants may also be present in the polymer. Contaminants that may be present may include polyethylene terephthalate, polyvinyl chloride, nylon, or a combination of these. Insoluble contaminants may also be present. There may be a filter located in the path of the polymer, such as after primary melting extruder 203 or secondary mixing extruder 205 to remove insoluble components. Such insoluble components may comprise contaminants such as glass, ceramics, sand, pieces of metal, undissolved plastics, or other contaminants. Filters may be cleaned manually or automatically in a continuous or periodic fashion.

Further, as described above, the mixing device or one or more of the feeders may have one or more vents that are operable to remove volatile contaminants from the mixture, such as the primary melting extruder vent 204, secondary mixing extruder vent 206, and mixing device vent 208. These vents may operate under vacuum, under atmospheric pressure, or under other pressures apparent to those of ordinary skill in the art. These vents may be present in the configurations shown in FIG. 2, or in other desirable configurations to remove volatile components, such as in positions that are different from those in FIG. 2 relative to feeder oil inlets. The volatile contaminants may comprise water, air, oxygen, HCl, volatile silicon compounds, and mixtures thereof. Some non-limiting examples of volatile silicon compounds include siloxanes and silanes. One or more HCl neutralizing agents, such as those described above, may be added to the polymer, to one or more of the fluid oil streams, or to both. It is envisioned that the mixing device may be selected to allow sufficient residence time for completion of operations such as mixing or degradation of polyvinyl chloride to HCl prior to removal.

FIG. 2 shows one or more embodiments. Other embodiments may be possible. For example, other configurations of two feeder systems may be possible. In addition, not all the feeder oil inlets may be present, and some feeders or mixing devices may have more than one feeder oil inlet. Furthermore, one or more of the feeder oil inlets may convey fluid oil from a different refinery stream into the feed system and in different quantities, with the outlet 221 still emptying into the refinery stream 211. There may be one or more filters located in the path of the polymer, such as after primary melting extruder or secondary mixing extruder. Additional feeders or mixing devices may be present as well.

Figure 3:
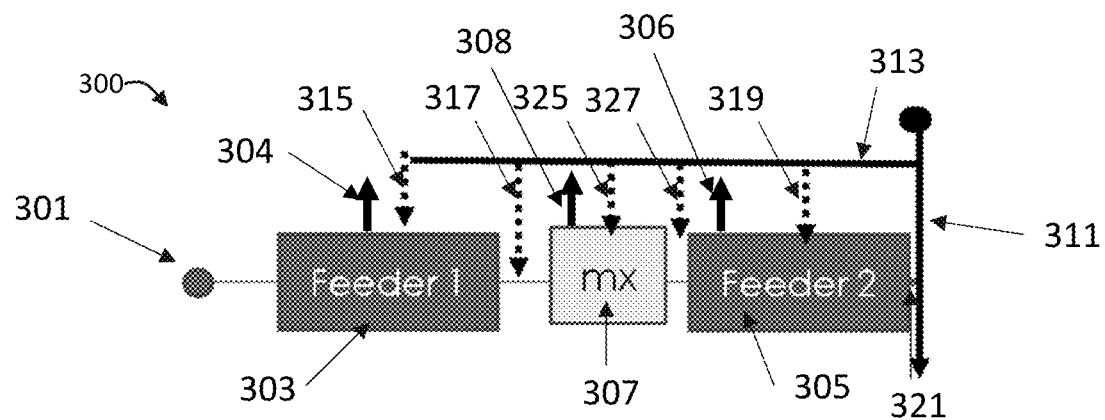
FIG. 3 is a depiction of a feed system 300 for recycling polymer in a refinery oil stream, according to one or more embodiments.

Turning now to FIG. 3, FIG. 3 is a depiction of a feed system 300 for recycling polymer in a refinery oil stream, according to one or more embodiments. Feed system 300 includes a polymer source 301 connected to two polymer feeders and a mixing device: primary melting extruder 303, mixing device 307, and secondary mixing extruder 305. The secondary mixing extruder 305 has an outlet 321 connecting it with a refinery oil stream 311. Several feeder oil inlets, also known as hydrocarbon inflow conduits, are present as well that are connected to a refinery oil stream 311 via a refinery oil offshoot 313. The feeder oil inlets include primary melting extruder inlet 315, post primary melting extruder inlet 317, mixing device inlet 325, post mixing device inlet 327, and secondary mixing extruder inlet 319. Several vents, specifically a primary melting extruder vent 304 and a secondary mixing extruder vent 306 are present as well, along with a mixing device vent 308.

In FIG. 3, polymer from the polymer source 301 is conveyed into primary melting extruder 303, where it is melted to produce a polymer melt. In one or more embodiments, primary melting extruder 303 may comprise any equipment capable of melting and conveying a polymer apparent to one of ordinary skill in the art. These may include, but are not limited to, one or more extruders. A primary melting extruder vent 304 is present in the current embodiments for the removal of volatile components from the primary melting extruder 303. A feeder oil inlet, primary melting extruder inlet 315, is present in the embodiments of FIG. 3, where it conveys a fluid oil from the refinery oil offshoot 313 to primary melting extruder 303. Upon the addition of fluid oil, the polymer melt is at least partially dissolved in the fluid oil, producing a polymer slurry that is further mixed. A polymer solution is formed upon full dissolution of the polymer melt in the fluid oil. The polymer slurry exits primary melting extruder 303, where additional fluid oil is added via post primary melting extruder inlet 317, before the material is conveyed into mixing device 307. In mixing device 307, additional fluid oil is added via a feeder oil inlet, mixing device inlet 325. Mixing device 307 may comprise any pieces of equipment capable of mixing the polymer slurry and fluid oil. These may include, but are not limited to, a continuous stirred tank mixer, a dynamic mixer, or static mixer. A mixing device vent 308 is present in the current embodiments to remove volatile components from mixing device 307. Upon exiting mixing device 307, additional fluid oil is added via post mixing device inlet 327. The polymer slurry with fluid oil is then conveyed into secondary mixing extruder 305, where it is mixed, and additional fluid oil is added via secondary mixing extruder inlet 319. Secondary mixing extruder 305 may comprise one or more pieces of equipment capable of mixing the polymer slurry with the fluid oil. These may include, but are not limited to a twin-screw extruder, and a single-screw extruder. A secondary mixing extruder vent 306 is present in the current embodiments to remove volatile components from secondary mixing extruder 305. The slurry and fluid oil are mixed in secondary mixing extruder 305, producing a polymer solution that is then conveyed into the refinery oil stream 311. The refinery oil stream may then take the refinery oil and polymer solution downstream to any number of refinery process units. These may include, but are not limited to, a delayed coking unit, a fluid catalytic cracking unit, a visbreaking unit, or a hydrocracking unit.

In the system of FIG. 3, the fluid oil may comprise one or more hydrocarbon fluids that may be present in a refinery. These include, but are not limited to, crude oil, vacuum residue, atmospheric residue, VGO, heavy mineral oil, and residual oils. Polymer may be present in the polymer solution in a concentration ranging from about 0.01% to about 99.99%, including those described above. Polymer may be in the form of granules, powder, crushed chunks, slurry, films, melt, fines, shavings, chips, pellets, flakes, nurdles, scraps or a mixture of these. The polymer may comprise one or more of polyethylene, polypropylene, polybutene, polybutadiene, ethylene-vinyl acetate polymer, polystyrene, ethylene vinyl alcohol (EVOH) polymer, co-polymers, or mixtures thereof. One or more polymer contaminants may also be present in the polymer. Contaminants that may be present may include polyethylene terephthalate, polyvinyl chloride, nylon, or a combination of these. Insoluble contaminants may also be present. There may be a filter located in the path of the polymer, such as after primary melting extruder—303 or secondary mixing extruder—305 to remove insoluble components. Such insoluble components may comprise contaminants such as glass, ceramics, sand, pieces of metal, undissolved plastics, or other contaminants. Filters may be cleaned manually or automatically in a continuous or periodic fashion.

It is also envisioned that the mixing device or one or more of the feeders may have one or more vents that are operable to remove volatile contaminants from the mixture, such as the primary melting extruder vent 304, secondary mixing extruder vent 306, and mixing device vent 308. These vents may operate under vacuum, under atmospheric pressure, or under other pressures apparent to those of ordinary skill in the art. These vents may be present in the configurations shown in FIG. 3, or in other desirable configurations to remove volatile components, such as in positions that are different from those in FIG. 3 relative to feeder oil inlets. The volatile contaminants may comprise water, air, oxygen, HCl, volatile silicon compounds, and mixtures thereof. Some non-limiting examples of volatile silicon compounds include siloxanes and silanes. One or more HCl neutralizing agents, such as those described above, may be added to the polymer, to one or more of the fluid oil streams, or to both. It is envisioned that the mixing device may be selected to allow sufficient residence time for completion of operations such as mixing or degradation of polyvinyl chloride to HCl prior to removal.

FIG. 3 shows one or more embodiments. Other embodiments may be possible. For example, other configurations of two feeder systems may be possible. In addition, not all the feeder oil inlets may be present, and some feeders or mixing devices may have more than one feeder oil inlet. Furthermore, one or more of the feeder oil inlets may convey fluid oil from a different refinery stream into the feed system and different quantities, with the outlet 321 still emptying into the refinery stream 311. There may be one or more filters located in the path of the polymer, such as after primary melting extruder or secondary mixing extruder. Additional feeders or mixing devices may be present as well.

EXAMPLES

Example 1

Braskem polypropylene (PP) and HDPE samples were dissolved in oil at varying concentration (0 to 100 wt. %) at 250° C. Heavy mineral oil (HMO) was used as surrogate for VGO. Viscosity was measured using a Brookfield refinery viscometer.

Figure 4:
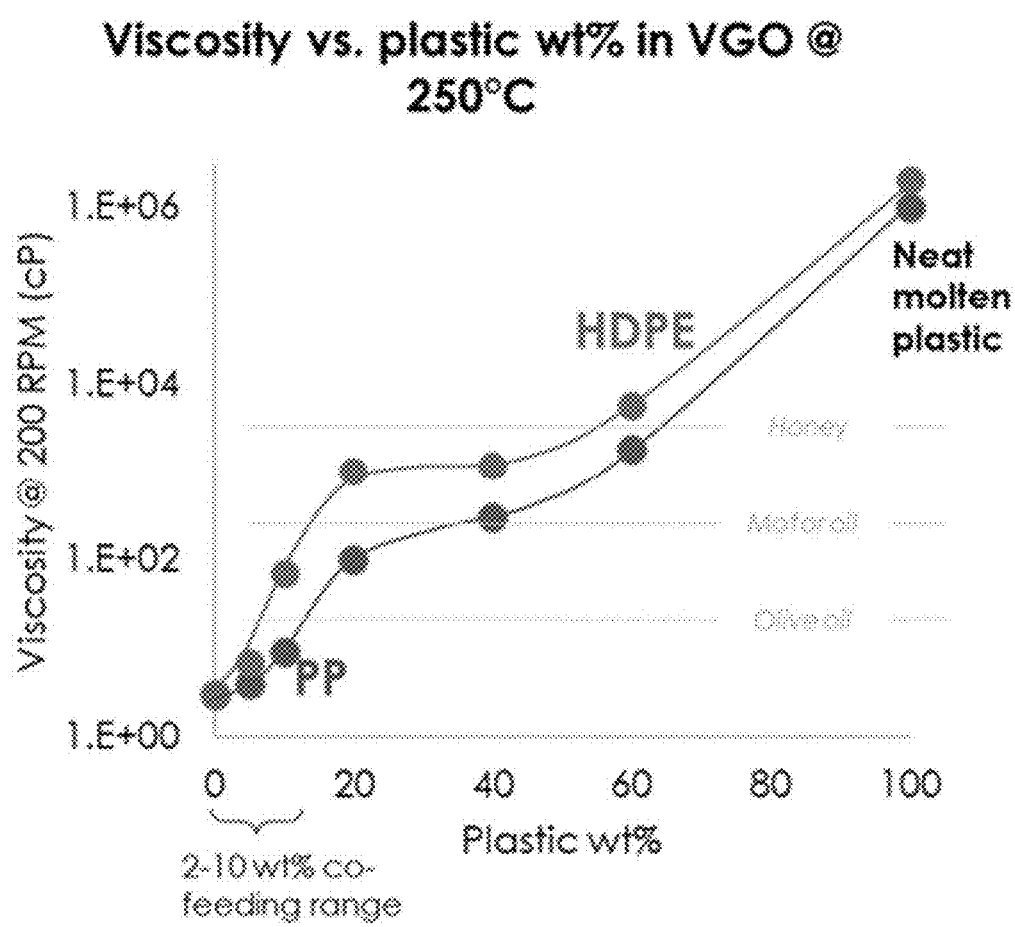
FIG. 4 is a depiction of plastic-oil viscosity data.

Plastic-oil viscosity data are represented in FIG. 4. As shown, the viscosity of HDPE and PP mixtures with VGO up to 60 wt. % is within acceptable handling range inside of the refinery up to 250° C.

Example 2

Composition of plastic feeds was varied using commercially available Braskem resins, including PVC (poly(vinyl chloride) grade Norvic SP1300FA manufactured by Braskem SA, Brazil), HDPE (high density polyethylene grade HDB0355A manufactured by Braskem Idesa, Mexico), LLDPE (linear low density polyethylene grade SLH118 manufactured by Braskem SA, Brazil), and HPP (polypropylene grade F040S manufactured by Braskem America Inc.). While PVC was provided as powder, PE (polyethylene) samples were provided as pellets. Polymer properties are listed in Table 1. Varying polymer compositions were used to cover possible plastic residue compositions as specified in Table 4.

Drakeol® 600 mineral oil was used as mimic solvent for vacuum gas oil (VGO). Drakeol® 600 mineral oil properties are provided in Table 2.

Octamethylcyclotetrasiloxane (≥97.5% purity) was purchased from Sigma-Aldrich and it was used as a representative of siloxanes often found in plastic residues.

TABLE 1

| Property | Unit | PVC | HPP | LLDPE | HDPE |
|---|---|---|---|---|---|
| Melt flow rate (190° C./2.16 kg) | g/10 min | Not available | 1.60 | 1.00 | 0.35 |
| Density | g/ml | 1.10-1.50 | 0.90-0.91 | 0.92 | 0.95 |
| Degree of crystallinity | % | — | 49 | 38 | 67 |
| Melting temperature | ° C. | 88 | 163 | 124 | 133 |
| Crystallization temperature | ° C. | 83 | 118 | 111 | 118 |
| K Value | — | 71 | — | — | — |
| Particles > 250 μm | wt. % | ≤1 | — | — | — |
| Particles > 63 μm | wt. % | ≥95 | — | — | — |

TABLE 2

| Property | Unit | Value |
|---|---|---|
| API Gravity at 15.5° C. | — | 31 |
| Specific gravity at 25/25° C. | — | 0.8666 |
| Saybolt color | — | 30 |
| Viscosity at 40° C. | cSt | 106.93 |
| Viscosity at 38° C. | SUS | 559.7 |
| Pour point | ° C. | −13 |
| Distillation 2.5% recovered | ° C. | 420 |
| Distillation 5% | ° C. | 437 |
| Refractive index at 25° C. | — | 1.4755 |
| Flash point | ° C. | 262 |

Figure 5:
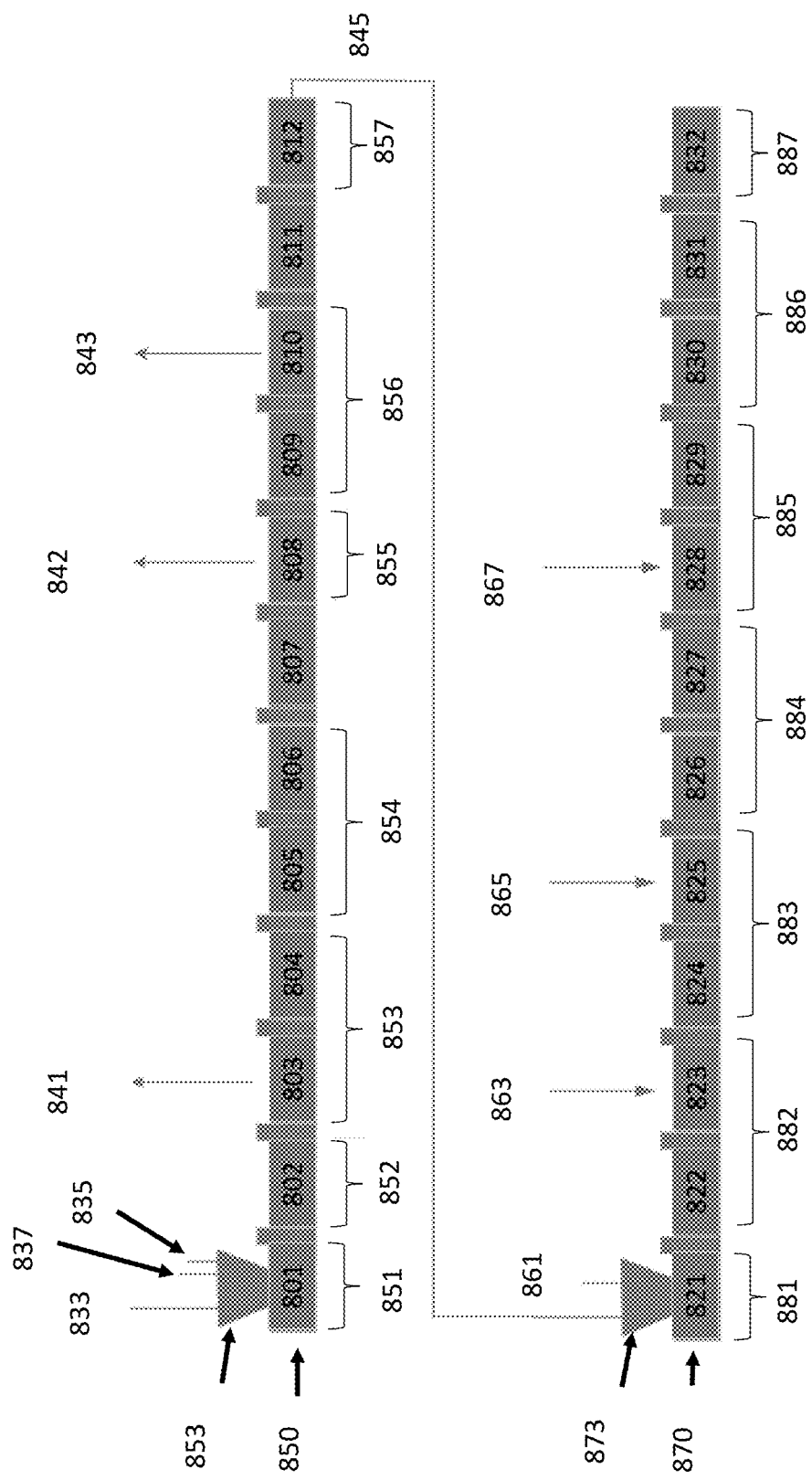
FIG. 5 is a depiction of an extruder system used to melt and mix the polymer in the examples.

In each of the following examples, two extruders were assembled in series to melt and mix plastic residues with mineral oil, as shown in FIG. 5. FIG. 5 is a depiction of an extruder system used to melt and mix the polymer in the examples.

The first extruder 850, the primary melting extruder, is a non-intermeshing counter-rotating (opposite direction) twin screw extruder (TSE) from NFM Welding Engineers. It uses a screw diameter of 30 mm. The second extruder 870, the secondary mixing extruder, is an intermeshing co-rotating (same direction) TSE from NFM Welding Engineers. It uses a screw diameter of 26 mm. Table 3 shows the characteristics of each extruder and their operating conditions. Each extruder includes multiple barrel segments labelled as barrels that may include inlets or vents. One or more barrels may be in a single heating zone, as shown in FIG. 5.

TABLE 3

| Characteristic | Unit | 1$^{st}$ Extruder | 2$^{nd}$ Extruder |
|---|---|---|---|
| Ratio of screw length to screw diameter | — | 70:1 6:1 | 48:1 |
| Screw diameter | mm | — | — |
| Arrangement 1 | | 30 | 26 |
| Arrangement 2 | | 26 | — |
| Screw speed | rpm | 350 | 300 |
| Screw max speed | rpm | 388 | 1200 |
| Motor max power | HP | 25 | 40 |
| Nitrogen flowrate at feed throat | ft$^3$/h | 20 | 20 |
| Flow rate | lb/h | — | — |
| Barrel 1 | | 25 lb/h (polymer) | 25 lb/h (polymer) |
| Barrel 2 | | — | — |
| Barrel 3 | | — | Varied (oil) |
| Barrel 4 | | — | — |
| Barrel 5 | | — | Varied (oil) |
| Barrel 6 | | — | — |
| Barrel 7 | | — | — |
| Barrel 8 | | — | Varied (oil) |
| Barrel 9 | | — | — |
| Barrel 10 | | — | — |
| Barrel 11 | | — | — |
| Barrel 12 | | — | — |
| Setpoint temperature | ° C. | — | — |

TABLE 3-continued

| Characteristic | Unit | 1st Extruder | 2nd Extruder |
|---|---|---|---|
| Barrel 1 | | 150 (zone 1) | 220 (zone 1) |
| Barrel 2 | | 230 (zone 2) | 220 (zone 2) |
| Barrel 3 | | 260 (zone 3) | 220 (zone 2) |
| Barrel 4 | | 260 (zone 3) | 220 (zone 3) |
| Barrel 5 | | 280 (zone 4) | 220 (zone 3) |
| Barrel 6 | | 280 (zone 4) | 220 (zone 4) |
| Barrel 7 | | spacer | 220 (zone 4) |
| Barrel 8 | | 320 (zone 5) | 220 (zone 5) |
| Barrel 9 | | 315 (zone 6) | 220 (zone 5) |
| Barrel 10 | | 315 (zone 6) | 220 (zone 6) |
| Barrel 11 | | spacer | 220 (zone 6) |
| Barrel 12 | | 310 (zone 7) | 220 (zone 7) |
| Pressure at venting port | torr | — | — |
| Barrel 1 | | — | — |
| Barrel 2 | | — | — |
| Barrel 3 | | 760 | — |
| Barrel 4 | | — | — |
| Barrel 5 | | — | — |
| Barrel 6 | | — | — |
| Barrel 7 | | — | — |
| Barrel 8 | | 11-90 | — |
| Barrel 9 | | — | — |
| Barrel 10 | | 8-40 | — |
| Barrel 11 | | — | — |
| Barrel 12 | | — | — |
| Residence time | s | 110 | 70 |

Via the primary melting extruder 830, a physical mixture of Braskem LLDPE SLH118 and Braskem HDPE HDB0355A was fed through a K-Tron K-ML-KT20 twin screw-feeder 833, whose composition was varied as shown in Table 4.

Table 4 lists inlet compositions for all runs. Cl and silicon additive amounts were derived from PVC and siloxane content. Homopolymer PVC grades typically contain 56 wt. % chlorine, and 1 g of Octamethylcyclotetrasiloxane contains 0.38 g of silicon.

Braskem HPP F040S was fed through a Brabender DDW MD3 DSR28-5 loss-in-weight (gravimetric) feeder 833. Nitrogen, as purge gas 837, 861 was applied to the feed throat 853 of the primary melting extruder 850 and the feed throat 873 of the secondary mixing extruder 870. Nitrogen was supplied by a NitroFill E-170H generator. Water or siloxane, when it was used, was pumped to an inlet 835 of the primary melting extruder using a ReaXus LS040 metering pump. The primary melting extruder 850 possessed twelve barrels 801-812, and seven zones 851-857. Three degassing ports 841, 842, and 843 were added into the primary mixing extruder 850. Degassing port #1—841 was under atmospheric pressure. A Busch NP 250 COBRA dry screw vacuum pump was used for degassing ports #2—842 and #3—843. The gas discharge was bubbled in a drum filled with water. The polymer discharge 845 of the primary melting extruder was fed by gravity to the feed throat 873 of the secondary mixing extruder 870. The secondary mixing extruder 870 possesses twelve barrels 821-832, and seven zones 881-887. Three mineral oil injection ports 863, 865, and 867 were added into the secondary mixing extruder 870. 35 mL/min of oil was delivered to inlet #1—863 and 55 mL/min was delivered to inlet #2—865 using Eldex 5984 metering pumps. Inlet #3—867 was fed by a Milton Roy pump and heated by a Mokon HTF system. A Wilden air diaphragm pump was attached to a 200-L mineral oil drum and directed the mineral oil stream to the cited pumps. Dies or screening were not added into the end of the extruders 850 and 870. Samples of blends of polymer and mineral oil were taken from the second extruder outlet. Obtained samples were left to cool at room temperature before their analysis.

Condensable gases released from the extruders were bubbled in a water drum. Samples of scrubber water were collected and analyzed by Braskem America Innovation & Technology Center in Pittsburgh to determine acidity, chlorine content, and silicon content.

A Mettler Toledo pH meter was used to measure the condensate's acidity and determine the chlorine concentration. Chlorine content was also determined by mercuric nitrate titrimetric chemistry using a CHEMetrics kit K-2020.

The silicon content was determined using an Agilent 5800 ICP-OE spectrometer. Samples were previously acid digested using Milestone UltraWave Single Reactor Chamber. 5 mL of sample and 1 mL of HNO$_3$ were microwave-digested at 1500 W in a sealed Teflon vessel under nitrogen. The sample was ramped to 230° C. and 150 bar over 30 min, and then held at 230° C. and 150 bar for 35 min.

Blends of polymer and oil were collected and further analyzed by the techniques listed below at Braskem America Innovation & Technology Center in Pittsburgh:

The determination of degree of crystallinity was carried out using a TA Discovery X3 XSC instrument. The samples with a weight of about 10 mg were put into an aluminum pan. All the experiments were conducted in nitrogen (flow rate of 50 mL/min), heating rate of 10° C./min, from room temperature until 250° C., and repeating the cycle twice. The degree of crystallinity is then defined as $$X_c = \frac{\Delta H_f(T_m)}{\Delta H_f^0 T_m^0} \times 100\% \qquad (1)$$

Where $X_c$ is degree of crystallinity, $\Delta H_f(T_m)$ is the enthalpy of fusion measured at melting point Tm, and $\Delta H_f^0(T_m^0)$ is the enthalpy of fusion of the totally crystalline polymer measured at the equilibrium melting point $T_m^0$.

Viscosity at 50, 100, and 250° C. were measured using a DV2T rheometer from AMETEK Brookfield and Thermosel for elevated temperature testing. Around 7 g of sample was placed inside of the Thermosel.

Viscosity was measured via frequency sweeps from 0.6 to 135 rad/s were performed using an Anton Paar MCR 501 with the CTD450L heater jacket. Sample was added between two 25 mm parallel plates and set gap at 2 mm. Sample was held at 250° C. for 3 min. Gas was set to 1.025 mm and samples were trim. Final gap was set at 1.00 mm. The procedure was again repeated for 150° C.

Density by displacement of isopropanol based on ASTM D792 was measured using a Mettle Toledo density kit and scales.

Moisture content was determined via TGA analysis used to determine the weight loss due to water vaporization to determine moisture content. Analysis was performed from room temperature to 500° C. under nitrogen flow rate of 10 ml/min, heating rate of 10° C./min, using a Mettler Toledo TGA2.

Air content and sample homogeneity was determined via images of external surface of solid samples captured using a Hirox KH-8700 optical microscope with MXG-2500REZ: Low-Range lens.

Table 4 lists all inlet compositions used in all 21 runs. Operating conditions of the primary melting extruder for all runs are provided in Table 5. Operating conditions of the secondary mixing extruder for all runs are provided in Table 6.

TABLE 4

| Run | Polymer (wt %) | | | | Additive (wt %) | | | | Mineral Oil/Polymer Ratio (wt %) | |
|---|---|---|---|---|---|---|---|---|---|---|
| | HPP | LLDPE | HDPE | PVC | Cl | Water | Siloxane | Si | Mineral Polymer | Oil |
| 1 | 100 | — | — | — | — | — | — | — | 51 | 49 |
| 1A | 100 | — | — | — | — | — | — | — | 100 | — |
| 2 | 75 | 12.5 | 12.5 | — | — | — | — | — | 51 | 49 |
| 3 | 50 | 25.0 | 25.0 | — | — | — | — | — | 51 | 49 |
| 3A | 50 | 25.0 | 25.0 | — | — | — | — | — | 100 | — |
| 4 | 25 | 37.5 | 37.5 | — | — | — | — | — | 46 | 54 |
| 5 | — | 50 | 50 | — | — | — | — | — | 46 | 54 |
| 6 | — | 100 | — | — | — | — | — | — | 46 | 54 |
| 7 | 25 | 37.5 | 37.5 | — | — | — | — | — | 100 | — |
| 8 | 25 | 37.5 | 37.5 | — | — | — | — | — | 71 | 29 |
| 9 | 25 | 37.5 | 37.5 | — | — | — | — | — | 61 | 39 |
| 10 | 25 | 37.5 | 37.5 | — | — | — | — | — | 41 | 59 |
| 11 | 25 | 37.5 | 37.5 | — | — | — | — | — | 32 | 68 |
| 11A | 25 | 37.5 | 37.5 | — | — | — | — | — | 23 | 77 |
| 14 | 25 | 37.5 | 37.5 | — | — | 9.3 | — | — | 50 | 50 |
| 15 | 25 | 37.5 | 37.5 | 3 | 1.7 | — | 1 | 0.4 | 46 | 54 |
| 15A | 25 | 37.5 | 37.5 | 3 | 1.7 | — | 0.3 | 0.1 | 46 | 54 |
| 16 | 25 | 37.5 | 37.5 | 1 | 0.6 | 9.3 | — | — | 46 | 54 |
| 16A | 25 | 37.5 | 37.5 | 1 | 0.6 | 9.3 | — | — | 100 | — |
| 17 | 25 | 37.5 | 37.5 | 3 | 1.7 | 9.3 | — | — | 46 | 54 |
| 18 | 25 | 37.5 | 37.5 | — | — | — | — | — | 46 | 54 |

TABLE 5

| Property Unit | | Feed rate of HPP lb/h | Feed rate of PE lb/h | Prod. Temp °C. | Zone 1 Temp °C. | Zone 2 Temp °C. | Zone 3 Temp °C. | Zone 4 Temp °C. | Zone 5 Temp °C. | Zone 6 Temp °C. | Zone 7 Temp °C. | Motor power kW | Specific rate kg/h/rpm | Specific energy kW h/kg |
|---|---|---|---|---|---|---|---|---|---|---|---|---|---|---|
| Run | 1 | 25 | 0 | 269 | 153 | 232 | 262 | 281 | 321 | 315 | 310 | 5 | 0.032 | 0.437 |
| | 1A | 25 | 0 | 305 | 158 | 228 | 259 | 283 | 325 | 317 | 310 | 6.3 | 0.032 | 0.556 |
| | 2 | 18.8 | 6.3 | 302 | 151 | 230 | 261 | 287 | 320 | 316 | 310 | 5.9 | 0.032 | 0.516 |
| | 3 | 12.5 | 12.5 | 302 | 150 | 232 | 262 | 284 | 321 | 316 | 310 | 6.8 | 0.032 | 0.595 |
| | 3A | 12.5 | 12.5 | 304 | 151 | 232 | 261 | 280 | 322 | 316 | 310 | 6.8 | 0.032 | 0.595 |
| | 4 | 6.3 | 18.8 | 313 | 151 | 232 | 260 | 284 | 317 | 302 | 310 | 9 | 0.032 | 0.794 |
| | 5 | 0 | 25 | 328 | 150 | 234 | 267 | 289 | 325 | 305 | 310 | 10.4 | 0.032 | 0.913 |
| | 6 | 0 | 25 | 316 | 151 | 233 | 271 | 295 | 323 | 303 | 309 | 9.5 | 0.032 | 0.834 |
| | 7 | 6.3 | 18.8 | 313 | 154 | 229 | 260 | 293 | 320 | 300 | 309 | 7.2 | 0.032 | 0.635 |
| | 8 | 6.3 | 18.8 | 303 | 154 | 232 | 260 | 287 | 327 | 302 | 310 | 7.2 | 0.032 | 0.635 |
| | 9 | 6.3 | 18.8 | 307 | 154 | 232 | 260 | 284 | 326 | 302 | 310 | 7.2 | 0.032 | 0.635 |
| | 10 | 6.3 | 18.8 | 306 | 154 | 232 | 261 | 283 | 324 | 302 | 310 | 7.7 | 0.032 | 0.675 |
| | 11 | 6.3 | 18.8 | 307 | 156 | 232 | 261 | 282 | 314 | 302 | 310 | 7.7 | 0.032 | 0.675 |
| | 11A | 6.3 | 18.8 | 305 | 153 | 232 | 262 | 281 | 316 | 302 | 310 | 7.2 | 0.032 | 0.635 |
| | 14 | 6.3 | 18.8 | 306 | 141 | 224 | 258 | 283 | 303 | 304 | 308 | 8.1 | 0.032 | 0.714 |
| | 15 | 6.3 | 18.8 | 308 | 156 | 233 | 260 | 290 | 302 | 302 | 310 | 7.2 | 0.032 | 0.635 |
| | 15A | 6.3 | 18.8 | 300 | 154 | 232 | 261 | 291 | 302 | 302 | 310 | 7.2 | 0.032 | 0.635 |
| | 16 | 6.3 | 18.8 | 314 | 148 | 232 | 261 | 289 | 302 | 302 | 310 | 7.7 | 0.032 | 0.675 |
| | 16A | 6.3 | 18.8 | 319 | 144 | 229 | 261 | 288 | 294 | 301 | 310 | 8.1 | 0.032 | 0.714 |
| | 17 | 6.3 | 18.8 | 293 | 154 | 232 | 262 | 292 | 307 | 301 | 310 | 7.2 | 0.032 | 0.635 |
| | 18 | 6.3 | 18.8 | 319 | 154 | 232 | 272 | 290 | 304 | 302 | 310 | 7.2 | 0.032 | 0.635 |

TABLE 6

| Property Unit | | Inj. 1 Oil Feed Rate mL/min | Inj. 2 Oil Feed Rate mL/min | Inj. 3 Oil Feed Rate mL/min | Product temp °C. | Zone 1 Temp °C. | Zone 2 Temp °C. | Zone 3 Temp °C. | Zone 4 Temp °C. | Zone 5 Temp °C. | Zone 6 Temp °C. | Zone 7 Temp °C. | Motor power kW | Specific rate kg/h/rpm | Specific energy kW h/kg |
|---|---|---|---|---|---|---|---|---|---|---|---|---|---|---|---|
| Run | 1 | 35 | 65 | 13.8 | 219 | 217 | 219 | 216 | 209 | 218 | 215 | 206 | 0.5 | 0.038 | 0.044 |
| | 1A | 0 | 0 | 0 | 236 | 217 | 219 | 217 | 212 | 217 | 217 | 228 | 1 | 0.032 | 0.088 |
| | 2 | 35 | 65 | 13.8 | 223 | 218 | 219 | 217 | 219 | 209 | 218 | 223 | 0.55 | 0.038 | 0.048 |
| | 3 | 35 | 65 | 13.8 | 225 | 216 | 218 | 219 | 210 | 215 | 218 | 224 | 0.55 | 0.038 | 0.048 |
| | 3A | 0 | 0 | 0 | 236 | 218 | 219 | 218 | 217 | 218 | 218 | 216 | 1 | 0.038 | 0.088 |
| | 4 | 35 | 55 | 18.8 | 227 | 219 | 219 | 218 | 218 | 218 | 219 | 206 | 1.2 | 0.038 | 0.106 |
| | 5 | 35 | 55 | 18.8 | 225 | 218 | 218 | 218 | 214 | 216 | 216 | 219 | 1.3 | 0.038 | 0.114 |

TABLE 6-continued

| Property Unit | Inj. 1 Oil Feed Rate mL/min | Inj. 2 Oil Feed Rate mL/min | Inj. 3 Oil Feed Rate mL/min | Product temp °C. | Zone 1 Temp °C. | Zone 2 Temp °C. | Zone 3 Temp °C. | Zone 4 Temp °C. | Zone 5 Temp °C. | Zone 6 Temp °C. | Zone 7 Temp °C. | Motor power kW | Specific rate kg/h/rpm | Specific energy kW h/kg |
|---|---|---|---|---|---|---|---|---|---|---|---|---|---|---|
| 6 | 35 | 55 | 18.8 | 228 | 219 | 218 | 217 | 216 | 218 | 216 | 208 | 1 | 0.038 | 0.088 |
| 7 | — | — | — | 248 | 217 | 218 | 217 | 218 | 218 | 218 | 214 | 1.4 | 0.038 | 0.123 |
| 8 | 35 | 55 | — | 240 | 217 | 219 | 218 | 220 | 218 | 219 | 213 | 0.9 | 0.038 | 0.079 |
| 9 | 35 | 55 | 5.5 | 229 | 216 | 219 | 219 | 217 | 217 | 220 | 216 | 0.9 | 0.038 | 0.079 |
| 10 | 35 | 55 | 26.3 | 219 | 217 | 218 | 217 | 210 | 217 | 218 | 220 | 0.8 | 0.038 | 0.07 |
| 11 | 35 | 55 | 35.3 | 207 | 216 | 218 | 219 | 209 | 216 | 218 | 215 | 0.8 | 0.038 | 0.07 |
| 11A | 35 | 55 | 62 | 201 | 218 | 218 | 218 | 219 | 218 | 219 | 219 | 0.75 | 0.038 | 0.066 |
| 14 | 35 | 55 | 18.8 | 226 | 217 | 218 | 218 | 218 | 218 | 219 | 217 | 0.85 | 0.038 | 0.075 |
| 15 | 35 | 55 | 18.8 | 236 | 219 | 219 | 217 | 212 | 217 | 219 | 206 | 1.1 | 0.038 | 0.097 |
| 15A | 35 | 55 | 18.8 | 236 | 217 | 220 | 218 | 210 | 219 | 218 | 210 | 1.2 | 0.038 | 0.106 |
| 16 | 35 | 55 | 18.8 | 181 | 163 | 208 | 192 | 196 | 179 | 175 | 165 | 1.6 | 0.038 | 0.141 |
| 16A | 0 | 0 | 0 | 238 | 210 | 218 | 233 | 216 | 224 | 223 | 200 | 2.8 | 0.038 | 0.246 |
| 17 | 35 | 55 | 18.8 | 236 | 216 | 218 | 219 | 218 | 219 | 217 | 217 | 1.1 | 0.038 | 0.114 |
| 18 | 35 | 55 | 18.8 | 230 | 216 | 219 | 219 | 218 | 217 | 218 | 225 | 1.1 | 0.038 | 0.097 |

Example 3

In order to demonstrate the benefit of adding oil to polymers per one or more embodiments, a mixed plastic feed formed from a mixture of polymers was used having the following composition set forth in Table 4. The results are presented in Table 7 (properties of the polymer-oil blend), Table 8 (properties of the melt polymer and polymer-oil blends), and FIGS. 6A-6D.

There is a reduction in density of polymer-oil blends as oil is added into it. On the other hand, $M_w$ and $M_n$ increase.

The shift of melting peak temperatures of polymer blend with no oil to lower temperatures as oil is added into the blend may be attributed to a decrease in polymer entanglement due to plasticizing effect of oil.

TABLE 7

| Property | Unit | Run 1 | 1A | 3 | 3A | 16 | 16A |
|---|---|---|---|---|---|---|---|
| Density | g/ml | 0.8459 | 0.8109 | 0.8400 | 0.8565 | 0.8626 | 0.9254 |
| $M_w$ | g/mol | 232200 | | 218750 | | 260050 | 142250 |
| $M_n$ | g/mol | 100400 | | 74650 | | 77550 | 35650 |
| Degree of crystallinity | % | 43 | 48 | 41 | 41 | 48 | 46 |
| Melting temperatures | °C. | — | — | 119 | 128 | 121 | 129 |
| | | 150 | 159 | 151 | 157 | 153 | 164 |
| Crystallization temperatures | °C. | 100 | — | 100 | — | 94 | — |
| | | — | 114 | 109 | 116 | 109 | 116 |

In addition, samples of melt polymer blend with no oil from the primary melting extruder outlet and samples of polymer-oil blends from the secondary mixing extruder outlet were collected and their physical properties were compared, as shown in Table 8.

Similar property behavior is observed for Table 7 and Table 8.

TABLE 8

| | | Run 11 | | Run 18 | |
|---|---|---|---|---|---|
| Property | Unit | 1st extruder | 2nd extruder | 1st extruder | 2nd extruder |
| Density | g/ml | 0.9215 | 0.8627 | 0.9272 | 0.8842 |
| $M_w$ | g/mol | 82250 | 388450 | | |
| $M_n$ | g/mol | 24700 | 153950 | | |
| Degree of crystallinity | % | 47 | 34 | 45 | 44 |
| Melting temperatures | °C. | 129 | 116 | 128 | 120 |
| | | 164 | 146 | 164 | 151 |
| Crystallization temperatures | °C. | — | 82 | — | 92 |
| | | 117 | 106 | 114 | 108 |

Figure 6A:
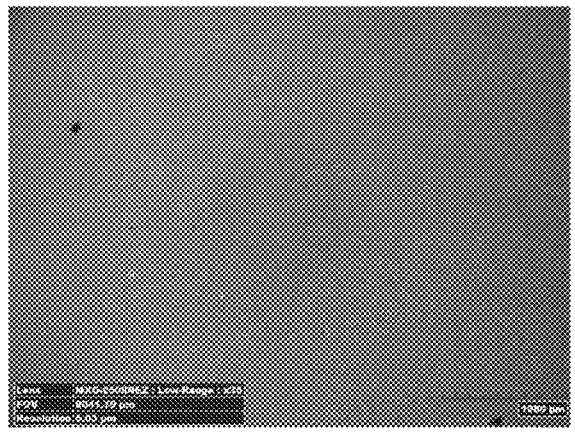
FIG. 6A shows an optical microscope image of a solid sample at the $1^{st}$ extruder exit with no oil addition in Example 3.
Figure 6B:
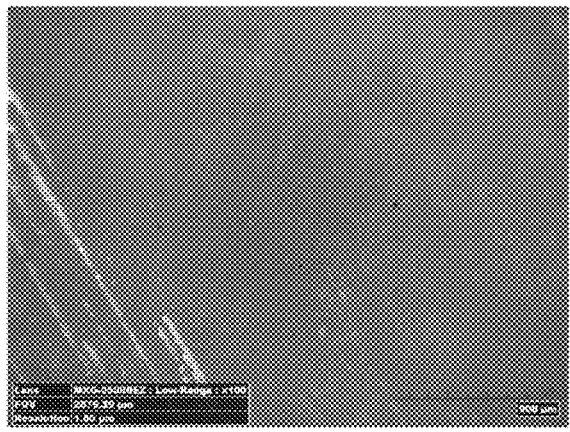
FIG. 6B shows an optical microscope image of a solid sample at the $1^{st}$ extruder exit with no oil addition in Example 3.
Figure 6C:
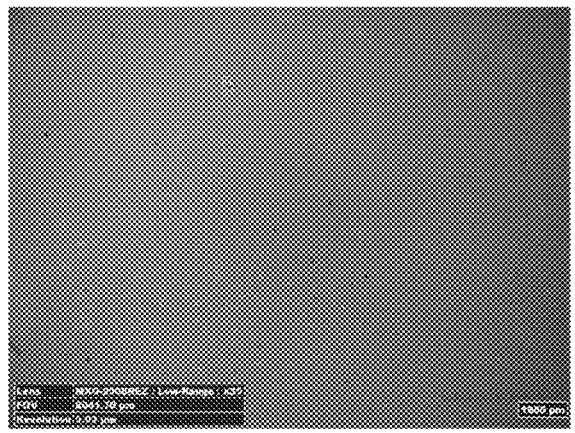
FIG. 6C shows an optical microscope image of a solid sample at the $2^{nd}$ extruder exit with oil addition in Example 3.
Figure 6D:
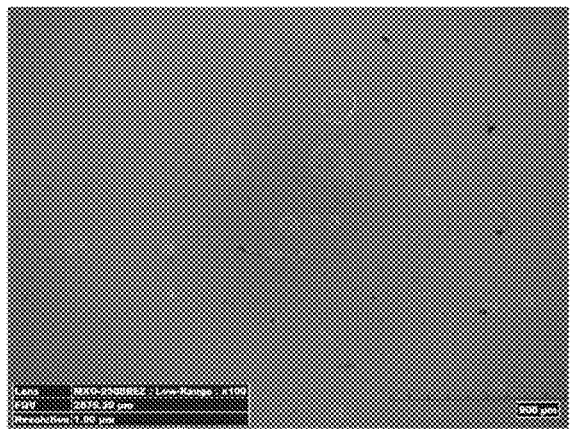
FIG. 6D shows an optical microscope image of a solid sample at the $2^{nd}$ extruder exit with oil addition in Example 3.

FIG. 6A-6D shows optical microscope images of solid sample from run 18. FIGS. 6A and 6B show optical microscope images of solid sample at the $1^{st}$ extruder exit with no oil addition under low magnification (6A) and high magnification (6B). FIGS. 6C and 6D show optical microscope images of solid sample at the $2^{nd}$ extruder exit with oil addition under low magnification (6C) and high magnification (6D). As seen in FIG. 6A-6D, oil addition enhances polymer dissolution and sample homogeneity. Small, dispersed oil droplets can be seen in FIG. 6C and FIG. 6D.

Example 4

To demonstrate how several oil concentrations can be blended with polymer and maintain the physicochemical properties of the blend inside of the acceptable range of processability of oil refineries, a mixed plastic feed formed from a mixture of polymers was used having the following composition set forth in Table 4. Oil concentration increased from 0 wt. % (run 7) to 77 wt. % (run 11A). The results are presented in Table 9 (properties of the polymer-oil blends), FIG. 7, and FIG. 8.

There is a reduction in density of polymer-oil blends as more oil is added into it. On the other hand, $M_w$ and $M_n$ increase as oil content increases.

A general decrease in viscosity is observed as the temperature increases. In addition, dynamic viscosity and complex viscosity decrease as oil content increases.

The shift of melting peak temperatures of polymer blend (run 7) from 129° C. and 164° C. to lower temperatures as oil addition is increased (runs 8, 9, 4, 10, 11, and 11A), can be attributed to a decrease in polymer entanglement due to plasticizing effect of oil. In addition, the degree of crystallinity decreases as oil addition increases.

There is a significant reduction of degree of crystallinity for samples with the highest oil loading (runs 11 and 11A).

Figure 7:
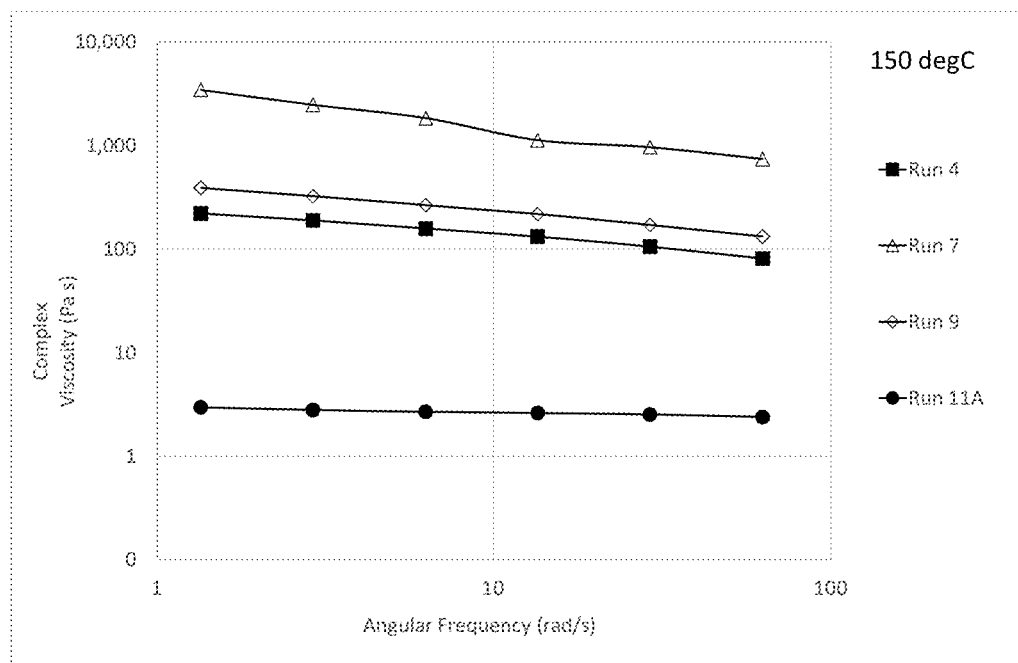
FIG. 7 displays the complex viscosity vs. angular frequency at 150° C. across run 4, run 7, run 9, and run 11A in Example 4.

FIG. 7 displays the complex viscosity vs. angular frequency at 150° C. across run 4, run 7, run 9, and run 11A.

Figure 8:
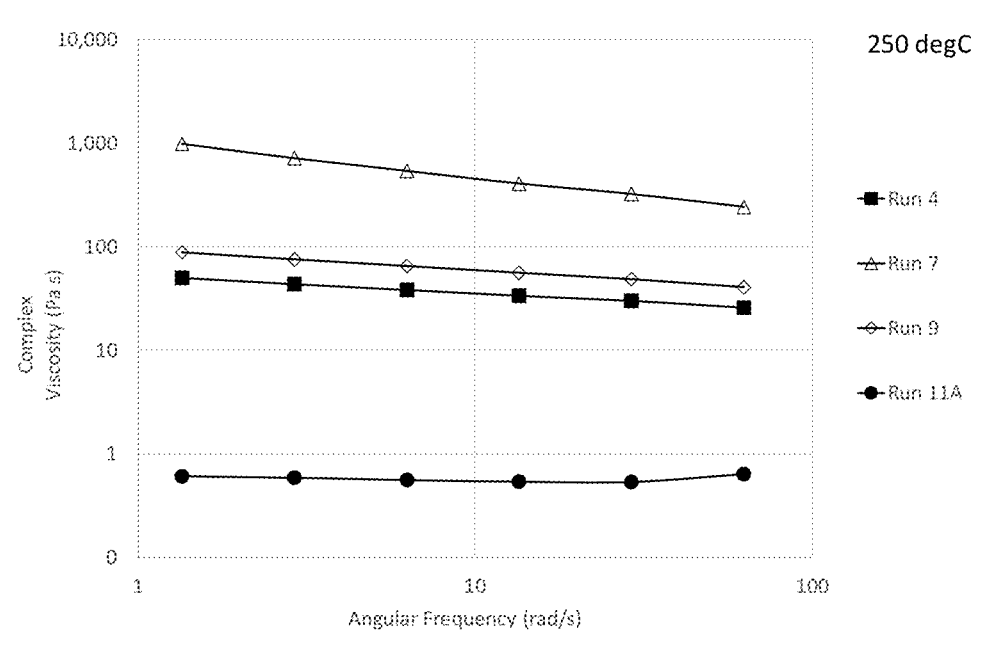
FIG. 8 displays the complex viscosity vs. angular frequency at 250° C. across run 4, run 7, run 9, and run 11A in Example 4.

FIG. 8 displays the complex viscosity vs. angular frequency at 250° C. across run 4, run 7, run 9, and run 11A.

As seen in FIG. 7 and FIG. 8, while run 11A, which contains more oil, shows a Newtonian flow behavior, the other samples show a non-Newtonian flow behavior. As seen in FIG. 8, at 250° C., LLDPE degradation may increase the blend viscosity due to cross-linking.

Example 5

To demonstrate how several polymer compositions can be blended with oil and maintain the physical properties of the blend inside of the acceptable range of processability of oil refineries, a mixed plastic feed formed from a mixture of polymers was used having the following composition set forth in Table 4. While HPP concentration decreased from 100 wt. % (run 1) to 0 wt. % (runs 5 and 6), LLDPE concentration increased from 0 wt. % (run 1) to 100 wt. % (run 6). HDPE concentration was varied only for runs 2 to 5. The results are presented in Table 10 (properties of the polymer-oil blends), FIG. 9, and FIG. 13.

There is a reduction in density of pure HPP from 0.8932 g/ml and pure LLDPE from 0.9100 g/ml to 0.8459 g/ml and 0.8780 g/ml, respectively, for polymer-oil blends.

Figure 9:
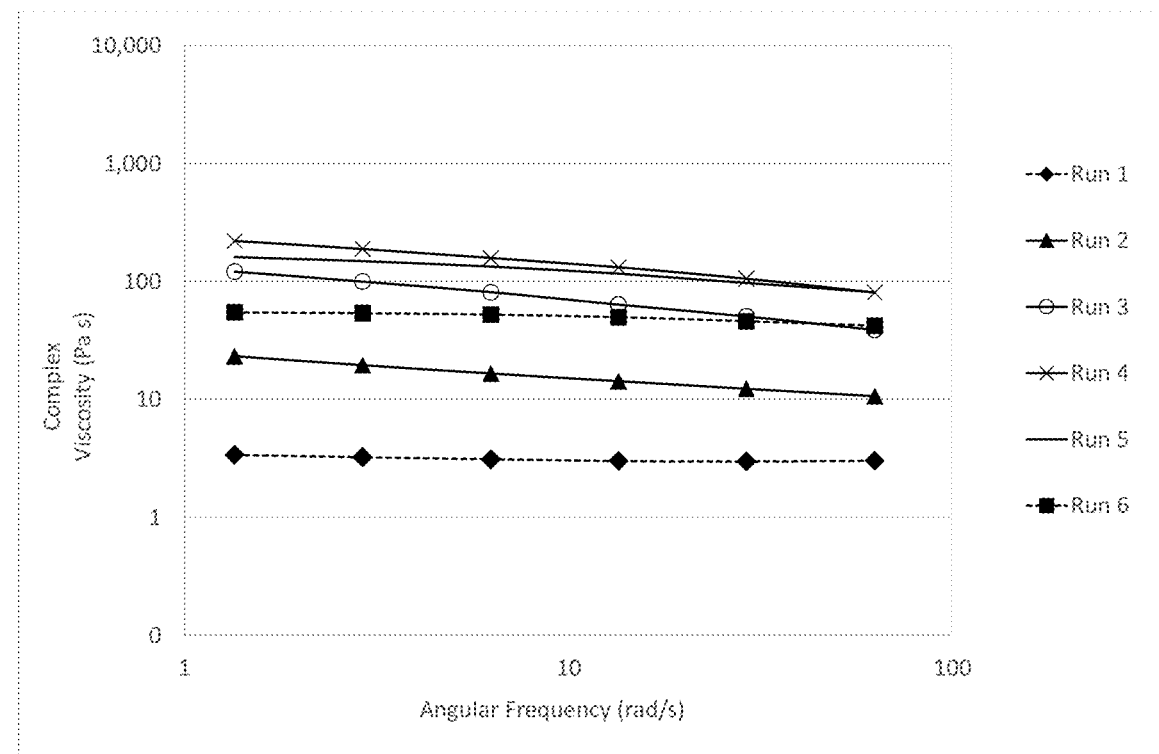
FIG. 9 displays the complex viscosity vs. angular frequency at 150° C. across runs 1-6 in Example 5.

FIG. 9 displays the complex viscosity vs. angular frequency at 150° C. across runs 1-6.

Figure 10:
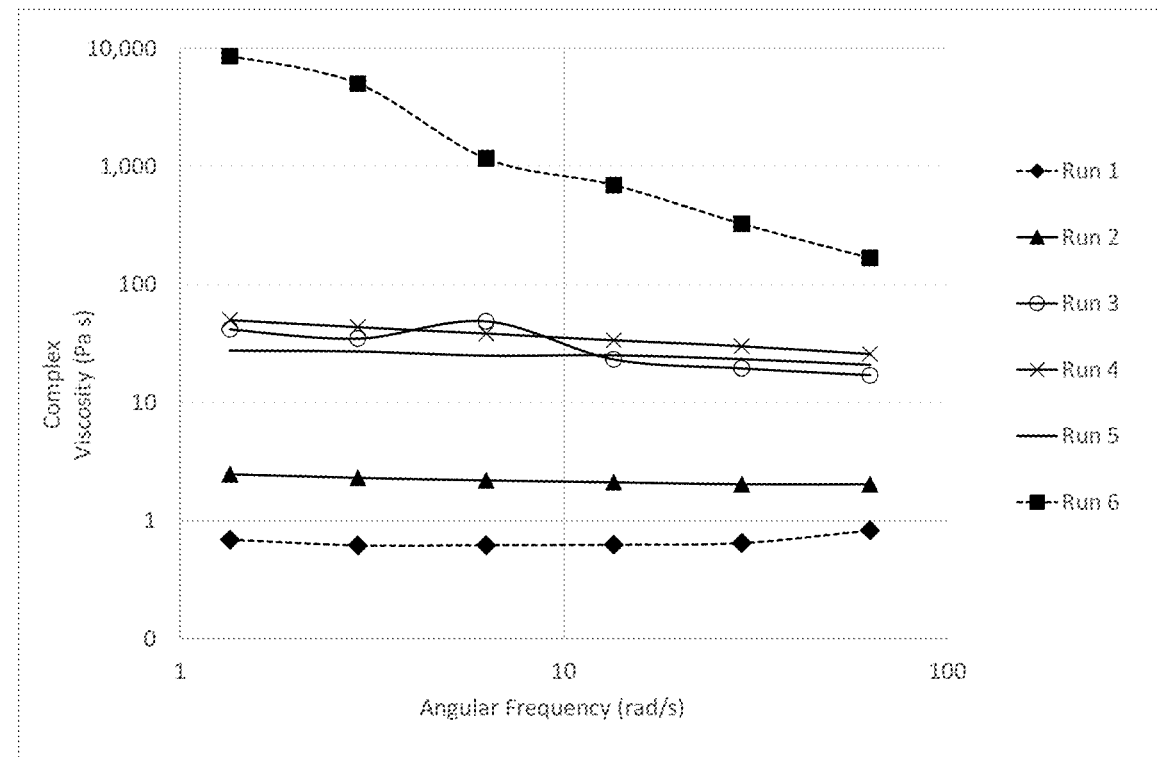
FIG. 10 displays the complex viscosity vs. angular frequency at 250° C. across runs 1-6 in Example 5.

FIG. 10 displays the complex viscosity vs. angular frequency at 250° C. across runs 1-6.

As seen in FIG. 9 and FIG. 10, a general decrease in viscosity is observed as the temperature increases. Viscosity values are within the processability range of refineries.

The shift of melting peak temperatures of pure HPP from 163° C. and pure LLDPE from 124° C. to lower temperatures after oil addition, run 1 at 150° C. and run 6 at 120° C., respectively, can be attributed to a decrease in polymer entanglement due to plasticizing effect of oil. In addition, there is a reduction of degree of crystallinity from 49 (pure HPP) to 43% (run 1) and 38 (pure LLDPE) to 35% (run 6) after oil addition.

TABLE 9

| Property | Unit | Run 4 | 7 | 8 | 9 | 10 | 11 | 11A |
|---|---|---|---|---|---|---|---|---|
| Density | g/ml | 0.8709 | 0.9219 | 0.8759 | 0.8841 | 0.8680 | 0.8627 | 0.8712 |
| $M_w$ | g/mol | 249050 | 73800 | 105800 | 137200 | 252300 | 388450 | 592750 |
| $M_n$ | g/mol | 79600 | 25400 | 37750 | 50700 | 86400 | 153950 | 241850 |
| Dynamic Viscosity at 250° C. | cP | | NA | NA | 126200 | 9813 | NA | 1240 |
| Degree of crystallinity | % | 49 | 47 | 48 | 43 | 40 | 34 | 38 |
| Melting temperatures | ° C. | 119 / 151 | 129 / 164 | 125 / 157 | 122 / 153 | 117 / 147 | 116 / 146 | 115 / 143 |
| Crystallization temperatures | ° C. | 89 / 109 | 94 / 116 | 92 / 111 | 94 / 110 | 84 / 107 | 82 / 106 | — / 117 |

TABLE 10

| Property | Unit | 1 | 2 | 3 | 4 | 5 | 6 |
|---|---|---|---|---|---|---|---|
| Density | g/ml | 0.8459 | 0.8502 | 0.8400 | 0.8709 | 0.8811 | 0.8780 |
| $M_w$ | g/mol | 232200 | 219850 | 218750 | 249050 | 156300 | 140900 |
| $M_n$ | g/mol | 100400 | 92500 | 74650 | 79600 | 56200 | 56900 |
| Degree of crystallinity | % | 43 | 45 | 41 | 49 | 54 | 35 |
| Melting temperatures | °C. | — 150 | 119 151 | 119 151 | 119 151 | 121 — | 120 — |
| Crystallization temperatures | °C. | 100 — | 101 109 | 100 109 | 89 109 | — 109 | — 106 |

Example 6

Figure 11:
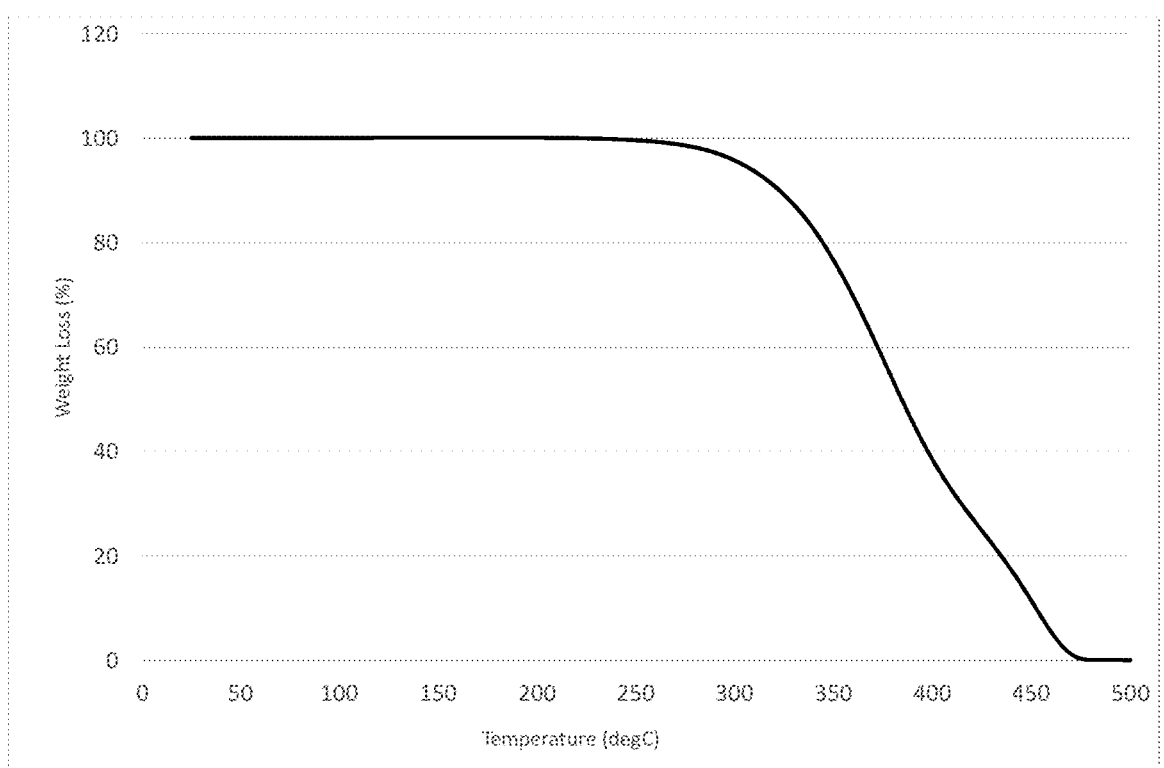
FIG. 11 shows TGA analysis of solid sample from run 14 in Example 6.

To demonstrate the removal of contaminants from blends of oil and polymer in accordance with the invention, a mixed plastic feed formed from a mixture of polymers was used having the following composition set forth in Table 4. Siloxane (runs 15 and 15A), and PVC (runs 15, 15A, 16, and 17) were added into the polymer feed to be removed in the first extruder. The vacuum exhaust from the first extruder was bubbled in 69 L of water. The analysis of scrubber water is shown in Table 11. Samples from the scrubber water were taking after each run or combined runs. In the case of runs 15 and 17, there was only one sample of scrubber water. Scrubber water was not replaced between runs. 9.3 wt. % of water was added into the polymer feed during run 14. Water droplets were seen inside of the extruder through the glass lid. FIG. 11 shows TGA analysis of solid sample from run 14. As seen in FIG. 11, the TGA profile shows no peak around 100° C. typical of water indicating complete removal of water during the process. Weight loss starts around 220° C. indicating polymer degradation. Therefore, the operating conditions of first extruder favor polymer degradation due to its highest temperature of 320° C. Weight loss at 320° C. is 9.3%.

As expected, the pH reduced over time due to higher amount of HCl in water. Chlorine concentration was determined from pH measurements. 0.59 Kg of PVC was added into the feed after 164 min of operation, which resulted in 0.33 Kg of chlorine. Therefore, 12 wt. % of chlorine was trapped in the scrubber water and 21 wt. % of PVC was degraded in the first extruder. The blend of polymer containing PVC and oil was black when compared against the white or transparent blends without PVC. This is a visual indication of PVC degradation.

Analysis of scrubber water samples is shown in Table 11. As expected, an increase of silicon content in the scrubber water is seen after siloxane addition.

Figure 12A:
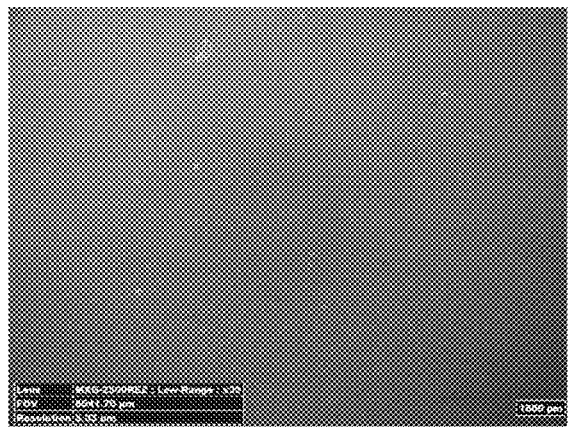
FIG. 12A shows an optical microscope image at low magnification from a sample collected at the first extruder exit in run 11 in Example 6.
Figure 12B:
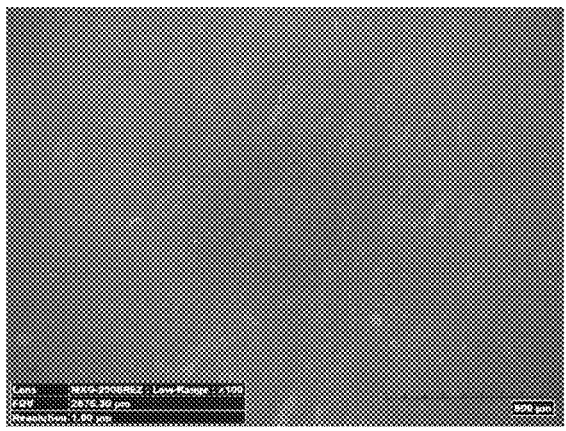
FIG. 12B shows an optical microscope image at high magnification from a sample collected at the first extruder exit in run 11 in Example 6.
Figure 12C:
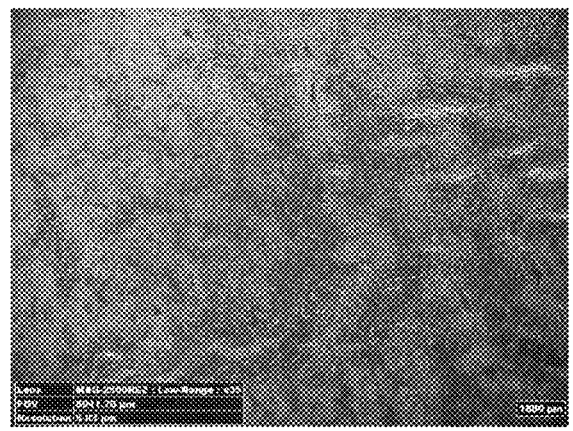
FIG. 12C shows an optical microscope image at low magnification from a sample collected at the first extruder exit in run 16A in Example 6.
Figure 12D:
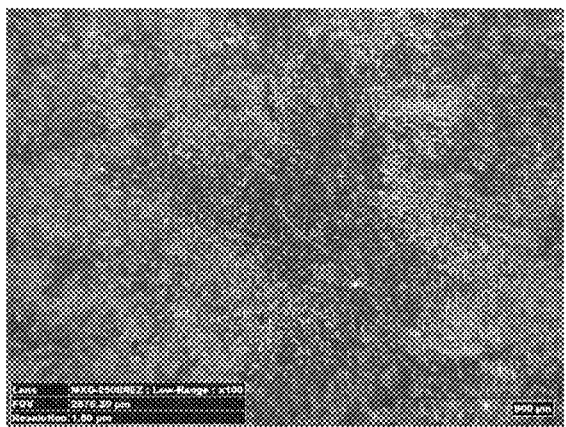
FIG. 12D shows an optical microscope image at high magnification from a sample collected at the first extruder exit in run 16A in Example 6.

Air also needs to be removed from the melt polymer. FIGS. 12A-D show the optical microscope images from samples collected at the first extruder exit in run 11 at low magnification (FIG. 12A) and high magnification (FIG. 12B) and in run 16 at low magnification (FIG. 12C), and high magnification (FIG. 12D). Run 11 has only polyolefins and run 16 has polyolefins, water, and PVC as feed. As seen in FIG. 12A-D, no bubbles are trapped in the solid samples. The color change between samples is due to PVC degradation, see images from run 16.

TABLE 11

| | | Samples | | |
|---|---|---|---|---|
| Measurement | Unit | Blank | Runs 17 & 15 | Run 15A |
| Time | min | 0 | 132 | 164 |
| pH | — | 7.8 | 2.12 | 1.79 |
| Chlorine by pH | wppm | 0 | 268.94 | 574.98 |
| Chlorine by titrimetry | wppm | 52 | 219 | 418 |
| Silicon | wppm | 6.45 | 7.93 | 8.36 |

Properties of the polymer-oil blends for runs 14, 15. 15A. 16, and 17 can be seen in Table 12.

TABLE 12

| Property | Unit | 14 | 15 | 15A | 16 | 17 |
|---|---|---|---|---|---|---|
| Density | g/ml | 0.8707 | 0.8765 | 0.8826 | 0.8626 | 0.8832 |
| $M_w$ | g/mol | 270200 | | 249850 | 260050 | 218250 |
| $M_n$ | g/mol | 80600 | | 75500 | 77550 | 67900 |
| Degree of crystallinity | % | 39 | 46 | 44 | 48 | 49 |
| Melting temperatures | °C. | 117 148 | 119 151 | 120 151 | 121 153 | 120 152 |
| Crystallization temperatures | °C. | 89 108 | 97 109 | 91 109 | 94 109 | 92 109 |

Example 7

To demonstrate the repeatability of the runs, physical properties of obtained polymer-oil blends are shown in Table 13. Runs 4, 10, and 18 have the same polymer composition, and similar oil concentration (54 wt. % for runs 4 and 18 and 59 wt. % for run 10). Properties are closely maintained between the three runs.

Figure 13:
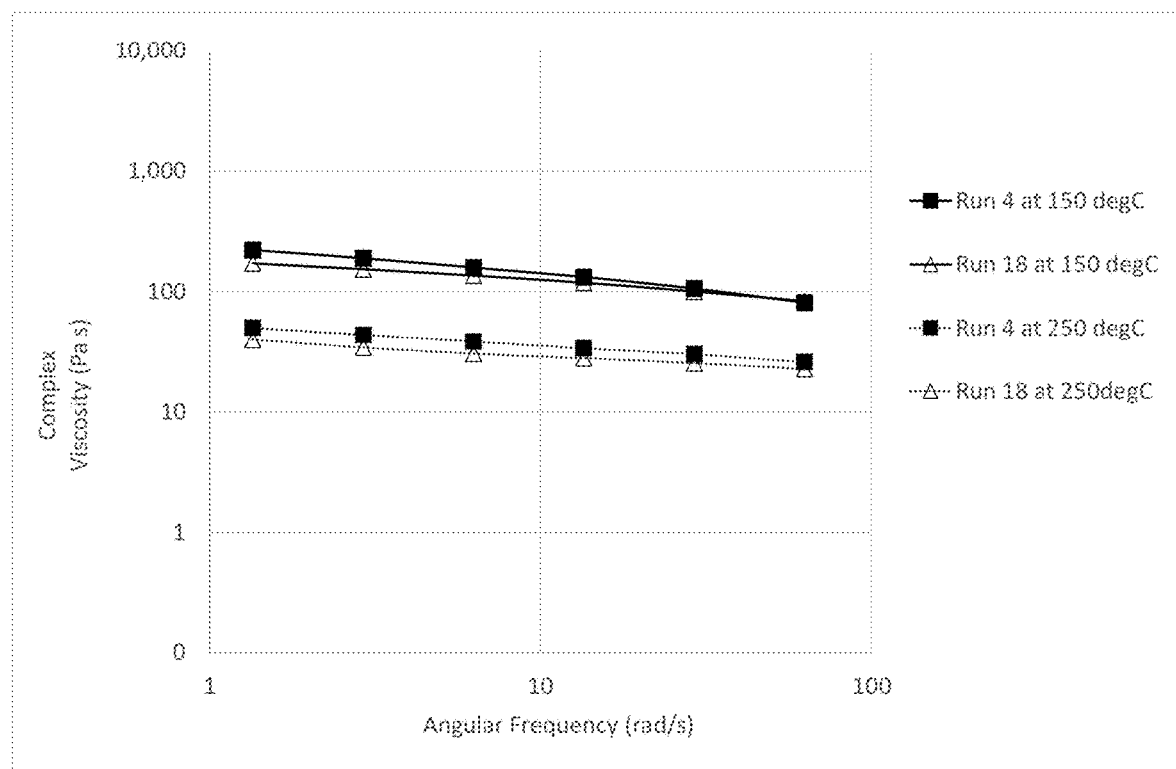
FIG. 13 displays the complex viscosity vs. angular frequency at 150° C. and 250° C. across runs 4 and 18 in Example 7.

FIG. 13 displays the complex viscosity vs. angular frequency at 150° C. and 250° C. across runs 4 and 18.

As seen in FIG. 13, a general decrease in viscosity is observed as the temperature increases.

TABLE 13

| | | Run | | |
|---|---|---|---|---|
| Property | Unit | 4 | 10 | 18 |
| Density | g/ml | 0.8709 | 0.8680 | 0.8842 |
| $M_w$ | g/mol | 249050 | 252300 | |
| $M_n$ | g/mol | 79600 | 86400 | |
| Degree of crystallinity | % | 49 | 40 | 44 |
| Melting temperatures | ° C. | 119 | 117 | 120 |
| | | 151 | 147 | 151 |
| Crystallization temperatures | ° C. | 89 | 84 | 92 |
| | | 109 | 107 | 108 |

Embodiments of the present disclosure may provide at least one of the following advantages. One or more embodiments may allow for polymer to be recycled without significantly altering the refinery processes. In addition, one or more embodiments may allow for contaminants and volatile components to be removed prior to introducing polymer and fluid oil into a refinery process unit.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A feed system for recycling a polymer comprising:
   a primary melting extruder for melting polymer to form a polymer melt;
   a secondary mixing extruder that receives the polymer melt from the primary melting extruder;
   one or more hydrocarbon inflow conduits for providing a fluid oil to the primary melting extruder and/or the secondary mixing extruder, wherein the primary melting extruder and/or the secondary mixing extruder are configured to form a polymer solution from the fluid oil and the polymer melt, wherein the polymer is at least partially dissolved in the fluid oil; and
   a feed system outlet for feeding the polymer solution to a refinery oil stream.

2. The system according to claim 1, further comprising a mixing device prior to the feed system outlet that receives and mixes the polymer melt or the polymer solution.

3. The system according to claim 2, wherein the mixing device comprises a continuous stirred tank mixer, a dynamic mixer, or a static mixer.

4. The system according to claim 2, wherein the primary melting extruder and/or the secondary mixing extruder and/or the mixing device comprises a vent for removing volatile contaminants.

5. The system according to claim 4, wherein the vent is configured to operate under a pressure that is less than or equal to atmospheric pressure.

6. The system according to claim 1, further comprising a mixing device in between the primary melting extruder and the secondary mixing extruder.

7. The system according to claim 1, further comprising one or more filters.

8. The system according to claim 1, wherein the one or more hydrocarbon inflow conduits are fluidly connected to the refinery oil stream to direct a portion of the refinery oil stream as the fluid oil into the primary melting extruder and/or the secondary mixing extruder.

* * * * *